United States Patent
Løngaa et al.

(10) Patent No.: US 11,576,000 B2
(45) Date of Patent: Feb. 7, 2023

(54) MONAURAL HEARING DEVICE WITH PARTS THAT ARE INTERCONNECTED UTILIZING NEAR-FIELD WIRELESS COMMUNICATION

(71) Applicant: GN Hearing A/S, Ballerup (DK)

(72) Inventors: Michael Løngaa, Farum (DK); Andreas Tiefenau, Gammel Holte (DK); Brian Dam Pedersen, Ringsted (DK)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 17/264,842

(22) PCT Filed: Aug. 19, 2019

(86) PCT No.: PCT/EP2019/072145
§ 371 (c)(1),
(2) Date: Jan. 31, 2021

(87) PCT Pub. No.: WO2020/038888
PCT Pub. Date: Feb. 27, 2020

(65) Prior Publication Data
US 2021/0297793 A1 Sep. 23, 2021

(30) Foreign Application Priority Data
Aug. 20, 2018 (EP) ..................................... 18189717

(51) Int. Cl.
*H04R 25/00* (2006.01)
*H04B 5/00* (2006.01)

(52) U.S. Cl.
CPC ......... *H04R 25/552* (2013.01); *H04B 5/0081* (2013.01); *H04R 25/505* (2013.01);
(Continued)

(58) Field of Classification Search
CPC ................ H04R 25/552; H04R 25/609; H04R 25/505; H04R 25/554; H04R 25/602;
(Continued)

(56) References Cited

U.S. PATENT DOCUMENTS

| | | | |
|---|---|---|---|
| 2006/0280324 A1 | 12/2006 | Beck et al. | |
| 2008/0031478 A1 | 2/2008 | Alber et al. | |
| 2008/0300658 A1* | 12/2008 | Meskens | A61N 1/36036 607/60 |

(Continued)

FOREIGN PATENT DOCUMENTS

| | | |
|---|---|---|
| CN | 101507293 | 8/2009 |
| CN | 103781009 | 5/2014 |

(Continued)

OTHER PUBLICATIONS

EP Office Action dated Sep. 14, 2021 for European patent application No. 18189717.4.

(Continued)

*Primary Examiner* — Sean H Nguyen
(74) *Attorney, Agent, or Firm* — Vista IP Law Group, LLP (57) ABSTRACT

A monaural hearing device includes: a first housing accommodating a first near-field magnetic induction communication unit and a first magnetic field antenna connected to the first near-field magnetic induction communication unit, wherein the first housing is configured for placement behind an ear of a user of the monaural hearing device; and a second housing accommodating a second near-field magnetic induction communication unit and a second magnetic field antenna connected to the second near-field magnetic induction communication unit; wherein the first and second near-field magnetic induction communication units connected to the first and second magnetic field antennas, respectively, are configured to perform near-field wireless data communication with each other.

20 Claims, 4 Drawing Sheets

(52) U.S. Cl.
CPC ......... *H04R 25/554* (2013.01); *H04R 25/602* (2013.01); *H04R 25/604* (2013.01); *H04R 25/609* (2019.05); *H04R 25/65* (2013.01); *H04R 2225/021* (2013.01); *H04R 2225/51* (2013.01)

(58) Field of Classification Search
CPC .................. H04R 25/604; H04R 25/65; H04R 2225/021; H04R 2225/51; H04B 5/0081
USPC ....................................................... 381/23.1
See application file for complete search history.

(56) References Cited

U.S. PATENT DOCUMENTS

| | | | |
|---|---|---|---|
| 2011/0286616 A1 | 11/2011 | Beck et al. | |
| 2013/0148831 A1 | 6/2013 | Andersen | |
| 2015/0255880 A1 | 9/2015 | Asai et al. | |
| 2016/0286323 A1 | 9/2016 | Buehl | |
| 2016/0330552 A1* | 11/2016 | Flood | H01Q 1/273 |
| 2019/0320269 A1* | 10/2019 | Haubrich | H04R 25/456 |

FOREIGN PATENT DOCUMENTS

| | | |
|---|---|---|
| DE | 102015203536 | 9/2016 |
| EP | 1583395 | 10/2005 |
| EP | 1583395 A2 | 10/2005 |
| EP | 1674057 | 6/2006 |
| EP | 2750408 | 7/2014 |
| EP | 3101917 A1 | 12/2016 |
| EP | 3103511 | 12/2016 |
| EP | 3113512 A1 | 1/2017 |
| EP | 3324650 A1 | 5/2018 |

OTHER PUBLICATIONS

PCT International Search Report and Written Opinion for International Appln. No. PCT/EP.

Extended European Search Report for EP Patent Appln. No. 18189717.4 dated Feb. 13, 2019.

Foreign OA for CN Patent Appln. No. 201980054952.2 dated Jul. 1, 2022.

* cited by examiner (Prior art)

MONAURAL HEARING DEVICE WITH PARTS THAT ARE INTERCONNECTED UTILIZING NEAR-FIELD WIRELESS COMMUNICATION

RELATED APPLICATION DATA

This application is national stage of International Patent Application No. PCT/EP2019/072145 filed on Aug. 19, 2019, which claims priority to European Patent Application No. 18189717.4 filed on Aug. 20, 2018. The entire disclosures of the above applications are expressly incorporated by reference herein.

FIELD OF TECHNOLOGY

A new monaural hearing device is provided that is configured to perform near-field wireless communication between parts of the new monaural hearing device that are accommodated by separate housings of the monaural hearing device.

BACKGROUND

BTE (behind-the-ear) hearings aids are well-known in the art. A BTE hearing aid has a BTE housing that is shaped to be worn behind a pinna of an ear of a user. The BTE housing accommodates components for hearing loss compensation. A sound signal transmission member, i.e. a sound tube or an electrical cable, transmits a signal representing the hearing loss compensated sound from the BTE housing into the ear canal of the user.

The output transducer may be a receiver positioned in an ear canal of the user of the hearing aid, a so-called Receiver-In-the-Ear. In the following, a hearing aid with a Receiver-In-the-Ear is denoted a RIE hearing aid.

In the RIE hearing aid, the sound signal transmission member comprises electrical conductors for propagation of hearing loss compensated audio sound signals from the hearing aid circuitry in the BTE hearing aid housing through the conductors to the receiver positioned in the ear canal of the user for emission of sound towards the eardrum of the user.

In order to position the receiver securely and comfortably in the ear canal of the user, an in-the-ear housing, earpiece, shell, or earmould may be provided for insertion into the ear canal of the user.

In the following, the terms in-the-ear housing, earpiece, shell, and earmould are used interchangeably.

Monaural head-sets that do not perform hearing loss compensation, but otherwise resemble the RIE hearing aids by having a BTE housing and an in-the-ear housing, are also well-known in the art.

Auxiliary devices that can be mounted to hearing aids for interfacing the hearing aids to external devices are also well-known in the art. Examples of such external devices include TVs, radios, mobile phones, digital audio players, streaming devices, programming devices, test devices, etc. Clearly, the physical connection used for such an auxiliary device must be very small. Some hearing aids use three small golden contact points on the underside of the BTE housing just above the battery door; other hearing aids have a proprietary set of contacts for connection with the auxiliary device. One known connector uses five contacts and may be used to interface to the hearing aid. The auxiliary device with the circuitry required to provide the desired interface to the hearing aid typically has a "piggy-back" housing and is typically referred to as a "boot", an "audio boot", or an "audio shoe". The housing of the auxiliary device may fit around the end of the BTE housing and may be detachably connected to the connector of the BTE housing, e.g. with a snap-fit coupling. The auxiliary device, e.g. the audio shoe, provides an audio signal that is forwarded to the hearing aid's Direct Audio Interface (DAI).

The various connectors for interfacing components and circuitry of the hearing aid, add to the size and cost of the hearing aid. Some hearing aid housings are so small that they do not have room for a connector so that an audio boot cannot be offered for such a hearing aid.

Thus, users who might benefit from further listening options have to select a monaural hearing device that supports auxiliary devices, such as audio boots.

SUMMARY

A new monaural hearing device is provided, comprising
a first housing accommodating a first near-field magnetic induction communication unit and a first antenna connected to the first near-field magnetic induction communication unit for performing near-field wireless data communication and that may be adapted for being mounted behind an ear, such as behind a pinna of the ear, of a user of the monaural hearing device,
a second housing accommodating a second near-field magnetic induction communication unit and a second antenna connected to the second near-field magnetic induction communication unit for performing near-field wireless data communication, wherein
the first and second near-field magnetic induction communication units are adapted for performing near-field wireless data communication of an audio signal from one of the first and second near-field magnetic induction communication units to the other one of the first and second near-field magnetic induction communication units.

The monaural hearing device may be a monaural hearing aid of any type that is configured to be head worn at an ear of a user of the monaural hearing aid, such as a Behind-The-Ear (BTE), a Receiver-In-the-Ear (RIE), etc., hearing aid with a hearing loss processor configured to process an audio signal and compensate a hearing loss of a user of the monaural hearing aid and provide a hearing loss compensated audio signal based on the audio signal to an output transducer of the monaural hearing aid.

The monaural hearing device may be a monaural head-set that do not perform hearing loss compensation, such as a monaural head-set with a BTE housing.

The first housing may be a BTE housing that is shaped to be worn behind an ear of a user, such as behind a pinna of the ear of the user of the monaural hearing device, and the second housing, such as the housing for an audio shoe, may be adapted for being mounted to the first housing, e.g. the second housing may be mechanically attached to, and possibly fit around, the BTE housing, e.g. detachably, e.g. with a snap-fit coupling.

The second housing may accommodate an energy storage device, such as a capacitor, etc., for supplying power to electronic circuitry accommodated by the second housing and that is connected to the second antenna for wireless reception of energy to be stored by the energy storage device.

Alternatively, or additionally, the second housing may accommodate a battery for supplying power to the electronic circuitry accommodated by the second housing.

The second housing may accommodate an RF-transceiver and an RF-antenna connected to the RF-transceiver for performing far-field wireless data communication with another device.

The second housing may for example be the housing of an audio shoe and accommodate a FM receiver, a mobile telephone interface, a remote control interface, a streaming interface, e.g. operating in accordance with the a Bluetooth standard, a telecoil, etc.

The second housing may be an in-the-ear housing, such as the housing of an earpiece of a RIE hearing aid, accommodating an output transducer, such as a receiver, adapted to convert the audio signal into an auditory output signal that can be received by the user's auditory system resulting in the user hearing sound, and possibly other components, such as one or more microphones, e.g. a microphone used for suppressing the occlusion effect and/or one or more microphones for recording directional cues.

The second housing may accommodate a memory for storing configuration information of circuitry and components accommodated in the second housing, e.g., for retrieval by a processor accommodated in the first housing for determination of the actual configuration of circuitry and components accommodated in the second housing, and thus the first and second near-field magnetic induction communication units may be adapted for performing near-field wireless data communication of configuration information from the second near-field magnetic induction communication unit to the first near-field magnetic induction communication unit.

Provision of near-field wireless data communication between components and electronic circuitry accommodated by the first and second housings, respectively, of the monaural hearing device, eliminates the need for connectors for interfacing components and electronic circuitry of the first and second housings of the monaural hearing device so that size and cost of the housings of the monaural hearing device can be minimized. Further, monaural hearing devices with housings too small to accommodate a connector may be equipped with the near-field wireless data communication so that the monaural hearing device can perform data communication with an auxiliary device, e.g., an audio shoe that accommodates circuitry with various additional functionality, in the same way as monaural hearing devices with housings large enough to accommodate a connector.

The first and second near-field magnetic induction communication units may be near-field magnetic induction communication units and the first and second antennas may be magnetic field antennas, each of which is operatively connected with the respective one of the first and second near-field magnetic induction communication units.

Near-Field Magnetic Induction communication (NFMI) utilizes a non-propagating magnetic field for communication between devices. The magnetic field antenna, e.g. a coil, in one device modulates a non-propagating magnetic field which is received and sensed by means of the magnetic field antenna in another device.

NFMI communication systems differ from other types of wireless communication systems that perform so-called "far-field" communication wherein an antenna is used to generate and transmit an electromagnetic wave radiating outwardly into free space. The power density of the radiated electromagnetic wave decreases with distance to the antenna, namely proportional to the inverse of the distance to the second power ($1/r^2$) or −20 dB per decade, which facilitates long range communication; whereas NFMI communication systems perform so-called "near-field" communication wherein transmission energy is contained within the localized magnetic field. The magnetic field energy does not radiate into free space. The power density of nearfield transmissions decreases at a rate proportional to the inverse of the distance to the antenna to the sixth power ($1/r^6$) or −60 dB per decade. The crossover point between near-field and far-field resides at approximately the wavelength λ divided by 2π at which point the propagating energy from NFMI communication systems conforms to the same propagation rules as any far-field system, i.e. power density of radiated energy decreases with distance to the second power; however, at the cross-over point, the propagated energy levels of NFMI communication systems are −40 dB to −60 dB lower than for an equivalent far-field communication system.

Thus, NFMI communication systems have a short range (typically less than 2 meters).

The standard modulation schemes used in typical RF communications (amplitude modulation, phase modulation, and frequency modulation) can be used in NFMI communication systems.

In current commercial implementations of near-field communications, the most commonly used carrier frequency is 13.56 MHz and has a wavelength λ of 22.1 meters.

Preferably, the monaural hearing device according to the appended set of claims performs near-field communication using carrier frequencies ranging from 1 MHz to 30 MHz, such as a carrier frequency of 10.66 MHz, or 13.56 MHz, or 22.66 MHz, etc.

The NFMI field is transmitted through human tissue with very little absorption as opposed to RF electromagnetic waves, making NFMI communication systems suitable for communication between devices residing at opposite ears of a human.

Each of the first and second magnetic field antennas may be embedded in a multi-layer printed circuit board (PCB) as disclosed in more detail in EP 3 324 650 A1.

Preferably, each of the first and second magnetic field antenna comprises a coil, preferably a coil with a magnetic core, preferably a ferrite core, for provision of a strong magnetic field with low loss and low cost.

Preferably, the first and second magnetic field antennas of the first and second housings are aligned for optimum reception of the magnetic field generated by one of the first and second magnetic field antennas and received by the other one of the first and second magnetic field antennas when the first and second housings are worn in their intended operational positions at an ear of the user for normal use of the monaural hearing device, whereby the receiving magnetic field antenna output a signal of maximum magnitude in response to the received modulated magnetic field as compared to the corresponding output signal for any other orientation and position of the first and second magnetic field antennas in the respective first and second housings.

For example, the first and second magnetic field antennas may be positioned in the first and second housings, respectively, of the monaural hearing device so that, when the first and second housings are worn in their intended operational positions at an ear of the user for normal use of the monaural hearing device, a centre axis of a magnetic field generated by one of the first and second field antennas is parallel to, and for optimum reception coincides with, a corresponding centre axis of a magnetic field generated by the other one of the first and second field antennas.

For example, the first and second magnetic field antennas may comprise first and second coils, respectively, and the first and second coils may be positioned in the first and second housings, respectively, of the monaural hearing device so that, when the first and second housings are worn in their intended operational positions at an ear of the user for normal use of the monaural hearing device, a centre axis of the first coil is parallel to, and for optimum reception preferably coincides with, a corresponding centre axis of the second coil.

For example, the first and second magnetic field antennas may comprise first and second coils and first and second magnetic cores, respectively, for provision of a strong magnetic field, and the first and second coils with the first and second magnetic cores may be positioned in the first and second housings, respectively, of the monaural hearing device so that, when the first and second housings are worn in their intended operational positions at an ear of the user for normal use of the monaural hearing device, a centre axis of the first magnetic core is parallel to, and preferably for optimum reception coincides with, a corresponding centre axis of the second magnetic core.

The first and second magnetic cores may be ferrite cores.

The first near-field magnetic induction communication unit connected to the first magnetic field antenna may also be used for near-field wireless communication with another device, e.g. for ear-to-ear communication, i.e. near-field wireless communication between two monaural hearing devices worn on opposite sides of the head of a user.

The near-field wireless communication may be performed in a near-field wireless communication network.

The monaural hearing device may advantageously be incorporated into a binaural hearing system, wherein two monaural hearing devices are interconnected utilizing NFMI communication for digital exchange of data, such as audio signals, signal processing parameters, control data, such as identification of signal processing programs, etc., etc., and optionally interconnected with other devices, such as a remote control, etc.

Thus, a binaural hearing system is provided with a first monaural hearing device and a second monaural hearing device, wherein each of the first and second monaural hearing devices has the first near-field magnetic induction communication unit connected to the first magnetic field antenna, and wherein each of the first near-field magnetic induction communication units connected to the respective first magnetic field antenna, is adapted for performing ear-to-ear communication, i.e. near-field wireless data communication between the first and second monaural hearing devices of the binaural hearing system.

One of, or both of, the first and second monaural hearing devices, has the second housing.

Preferably, for ear-to-ear communication, the first magnetic induction antennas of the first and second monaural hearing devices, respectively, are positioned so that, when the first and second monaural hearing devices are worn at the ears of the user of the binaural hearing system in their intended operational positions for normal use of the binaural hearing system, a centre axis of a magnetic field generated by one of the first magnetic field antennas is parallel to, and preferably coincides with, a corresponding centre axis of a magnetic field generated by the other one of the first magnetic field antennas, and preferably, the second magnetic field antenna is positioned so that a centre axis of a magnetic field generated by one of the first magnetic field antennas is parallel to, and displaced with relation to, a corresponding centre axis of a magnetic field generated by the second magnetic field antenna when the second housing is mounted to the first housing of one of the first and second monaural hearing devices in its intended operational position for normal use.

For example, in the event that each of the first magnetic field antennas and the second magnetic field antenna comprises a coil wound around a ferrite core, the ferrite cores of the first magnetic field antennas preferably have a common centre axis, when the first and second monaural hearing devices are worn at the ears of the user of the binaural hearing system in their intended operational positions for normal use, and the ferrite core of the second magnetic field antenna has a centre axis that is parallel to and displaced with relation to the common centre axis of the first magnetic field antennas.

Typically, an analogue audio signal, as e.g. provided by a microphone, is made suitable for digital signal processing by conversion into a corresponding digital audio signal in an analogue-to-digital converter whereby the amplitude of the analogue audio signal is represented by a binary number. In this way, a discrete-time and discrete-amplitude digital audio signal in the form of a sequence of digital values represents the continuous-time and continuous-amplitude analogue audio signal. In the following, the discrete-time and discrete-amplitude digital audio signal in the form of a sequence of digital values is denoted "digital audio" in short.

Throughout the present disclosure, the term "audio signal" is used to identify any analogue or digital signal that occurs along a signal path that is connected to an output transducer that converts the audio signal to acoustic sound for emission towards an ear of the user. The audio signal may be subjected to various types of signal processing along the signal path, including filtering, amplification, frequency transformation, dynamic range compression, data compression for data reduction, etc., as is well-known in the art of audio signal processing.

Throughout the present disclosure, the term "audio signal" may be used to identify any analogue or digital signal found along the signal path from the output of e.g. one or more microphones, telecoil, or near-field magnetic induction communication unit to an input of a signal processor of the monaural hearing device, such as the hearing loss processor of a monaural hearing aid.

Throughout the present disclosure, in a hearing device, the term "processed audio signal"; or, specifically in a hearing aid, the term "hearing loss compensated audio signal", may be used to identify any analogue or digital signal found along the signal path from the output of the signal processor, such as the hearing loss processor of a hearing aid, to an input of the output transducer.

The output transducer may be a receiver of a monaural hearing aid, a loudspeaker of a monaural head-set, etc., configured to output an acoustic output signal based on the audio signal input to the output transducer and emitted towards an ear of the user, whereby the user hears sound.

Each near-field magnetic induction communication unit may be a circuit comprising both a near-field wireless transmitter and a near-field wireless receiver. The transmitter and receiver may share common circuitry and/or a single die or housing.

Alternatively, the transmitter and receiver may share no circuitry, and each near-field magnetic induction communication unit may comprise separate dies or housings with the transmitter and the receiver, respectively.

Signal processing in the new monaural hearing device may be performed by dedicated hardware or may be performed in one or more signal processors, or performed in a combination of dedicated hardware and one or more signal processors.

As used herein, the terms "processor", "signal processor", "controller", "system", etc., are intended to refer to CPU-related entities, either hardware, a combination of hardware and software, software, or software in execution.

For example, a "processor", "signal processor", "controller", "system", etc., may be, but is not limited to being, a process running on a processor, a processor, an object, an executable file, a thread of execution, and/or a program.

By way of illustration, the terms "processor", "signal processor", "controller", "system", etc., designate both an application running on a processor and a hardware processor. One or more "processors", "signal processors", "controllers", "systems" and the like, or any combination hereof, may reside within a process and/or thread of execution, and one or more "processors", "signal processors", "controllers", "systems", etc., or any combination hereof, may be localized on one hardware processor, possibly in combination with other hardware circuitry, and/or distributed between two or more hardware processors, possibly in combination with other hardware circuitry.

Also, a processor (or similar terms) may be any component or any combination of components that is capable of performing signal processing. For examples, the signal processor may be an ASIC processor, a FPGA processor, a general purpose processor, a microprocessor, a circuit component, or an integrated circuit.

Other and further aspects and features will be evident from reading the following detailed description.

BRIEF DESCRIPTION OF THE DRAWINGS

In the following, the new monaural hearing device and new binaural hearing system are explained in more detail with reference to the drawings, wherein.

DETAILED DESCRIPTION OF THE DRAWINGS

Various embodiments are described hereinafter with reference to the figures. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages of the invention shown. An aspect or an advantage described in conjunction with a particular embodiment is not necessarily limited to that embodiment and can be practiced in any other embodiments even if not so illustrated or if not so explicitly described.

Below, various examples of the new monaural hearing device are illustrated. The new monaural hearing device according to the appended claims may, however, be embodied in different forms and should not be construed as limited to the examples set forth herein.

Like reference numerals refer to like elements throughout. Like elements will, thus, not be described in detail with respect to the description of each figure.

FIG. 1 is a reproduction of FIG. 1 of U.S. Pat. No. 6,155,748 disclosing examples of conventional monaural hearing aids with conventional audio shoes.

FIG. 1 shows in perspective a conventional monaural hearing device 10 in the form of a BTE hearing aid 10 and a conventional audio shoe 100 and the conventional manner of connecting the BTE hearing aid 10 with the audio shoe 100.

Figures 1A, 1C:
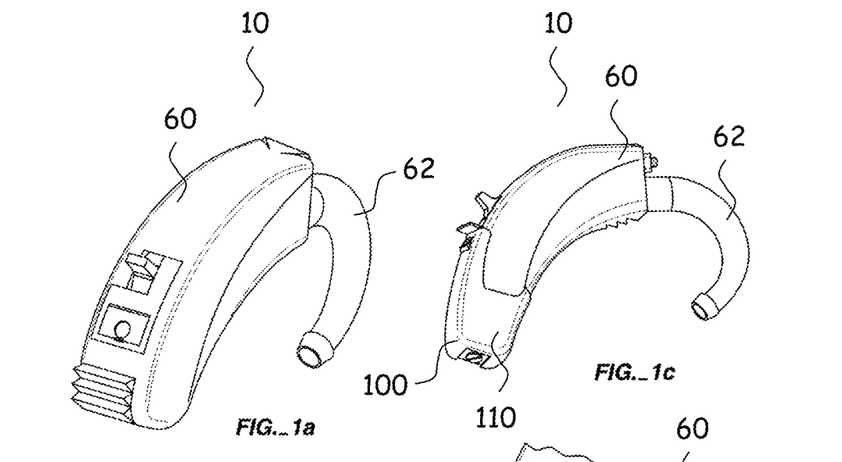
FIG. 1 shows in perspective a conventional monaural hearing device with a conventional audio shoe.
Figure 1B:
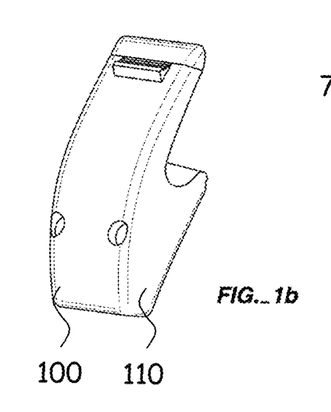
Figure 1D:
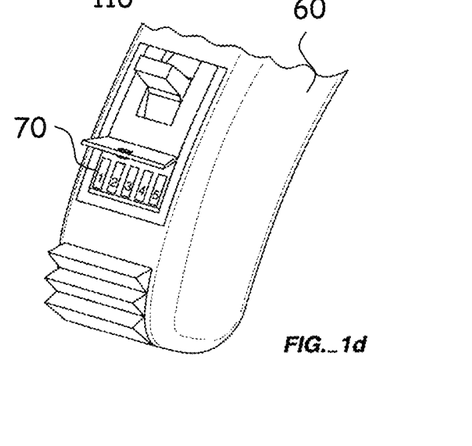

FIG. 1a is a perspective view of a conventional BTE hearing aid 10 with a first housing in the form of a BTE housing 60 adapted to be worn behind a pinna of an ear of a user of the BTE hearing aid 10, and an ear hook 62; FIG. 1b is a perspective view of an audio shoe 100; FIG. 1c is a perspective view of the audio shoe 100 with a housing 110 connected to the BTE hearing aid 10; and FIG. 1d is an enlarged view of a portion of the BTE hearing aid 10 of FIG. 1a showing in greater detail a conventional connector 70 accommodated by the BTE housing 60 utilizing five contacts to interface to the audio shoe 100.

The new monaural hearing device according to appended claim 1 may have a first housing that is similar to the BTE housing 60 shown in FIG. 1 except for the fact that the first housing of the new monaural hearing device does not have the connector 70. Likewise, the new monaural hearing device may have a second housing that is similar to the housing 110 of the audio shoe 100 shown in FIG. 1 except for the fact that the second housing of the new monaural hearing device does not have a connector accommodated by the second housing and matching a corresponding connector accommodated by the first housing.

Figure 2:
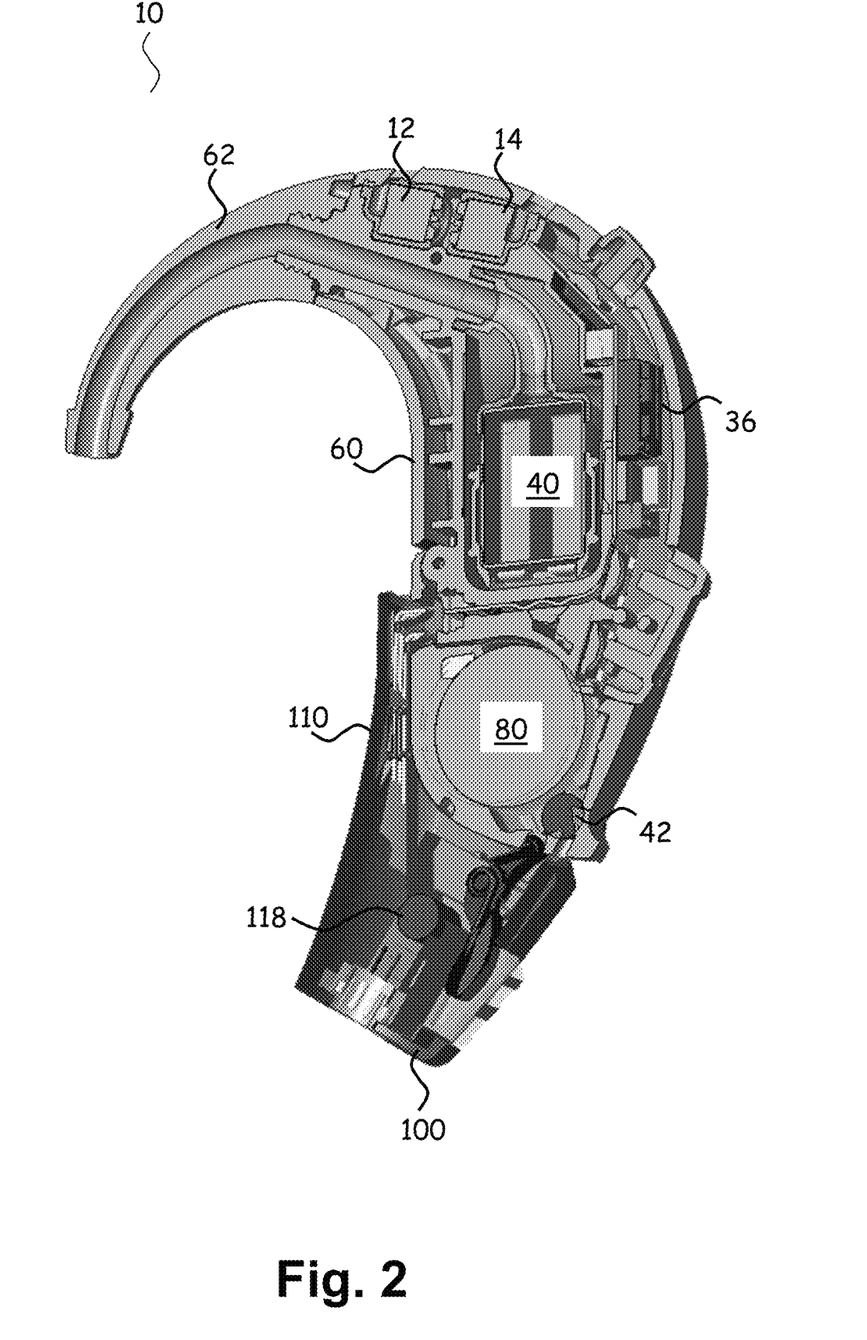
FIG. 2 shows in perspective a new monaural hearing device according to appended claim 1.

FIG. 2 shows in perspective a monaural hearing device 10 according to appended claim 1 that may form part of a binaural hearing system according to appended claim 11 and that is mechanically similar to the monaural hearing device shown in FIG. 1 apart from the fact that the wired interface of the monaural hearing device of FIG. 1 between electronic circuitry accommodated by the first housing 60 and electronic circuitry accommodated by the second housing 110 has been eliminated and substituted by a near-field wireless interface in the monaural hearing device of FIG. 2.

In FIG. 2 half of the first and second housings 60, 110 has been cut away for illustration purposes so that internal components accommodated by the housings 60, 110 have been made visible.

The new monaural hearing device 10 shown in FIG. 2 has the electronic circuitry 11 shown in FIG. 3 that is explained in more detail below and that is supplied with power from a battery 80 accommodated by the first housing 60.

The new monaural hearing device 10 shown in FIG. 2 is a monaural hearing aid 10 that comprises a first housing 60 in the form of a BTE housing 60 adapted to be worn behind a pinna (not shown) of a user (not shown) of the monaural hearing aid 10. The BTE housing 60 accommodates a first near-field magnetic induction communication unit (not shown), and a first magnetic field antenna 42 that is connected to the first near-field magnetic induction communication unit (not shown) for performing near-field wireless data communication.

The monaural hearing aid 10 further comprises a second housing 110 in the form of the housing 110 of an audio shoe 100. The housing 110 of the audio shoe 100 accommodates a second near-field magnetic induction communication unit (not shown), and a second magnetic field antenna 118 that is connected to the second near-field magnetic induction communication unit (not shown) for performing near-field wireless data communication with the first magnetic field antenna 42 and the first near-field magnetic induction communication unit (not shown).

The first and second near-field magnetic induction communication units (not shown) are adapted for performing near-field wireless data communication, including data communication of digital audio from one of the near-field magnetic induction communication units (not shown) to the other one of the near-field magnetic induction communication units (not shown). The digital audio may be digital audio from a streaming device transmitted wirelessly to the audio shoe, e.g. in accordance with the Bluetooth standard.

In the monaural hearing aid 10 shown in FIG. 2, the first and second magnetic field antennas 42, 118 are aligned for optimum reception of the magnetic field generated by one of the first and second magnetic field antennas 42, 118 and received by the other one of the first and second magnetic field antennas 42, 118.

In the monaural hearing aid 10 shown in FIG. 2, each of the first and second magnetic field antennas 42, 118 comprises a coil wound around a ferrite core for provision of a strong magnetic field at low loss and low cost as is well-known in the field of ferrite antennas. Thus, the first magnetic field antenna 42 comprises a first coil wound around a first ferrite core, and the second magnetic field antenna 118 comprises a second coil wound around a second ferrite core. The first and second coils are positioned in the first and second housings 60, 110, respectively, so that, when the first and second housings 60, 110 are operationally attached to each other and ready to be worn by the user for normal operation, a centre axis of the first coil is parallel to a corresponding centre axis of the second coil for optimum reception of the magnetic field generated by one of the first and second magnetic field antennas 42, 118 and received by the other one of the first and second magnetic field antennas 42, 118.

The monaural hearing aid 10 may advantageously be incorporated into a binaural hearing aid system (not shown), wherein the monaural hearing aid 10 is connected with another monaural hearing aid that is similar to the monaural hearing aid shown in FIG. 2 except for the fact that the other monaural hearing aid need not have an audio shoe 110 attached to its first housing 60. The two monaural hearing aids of the binaural hearing aid system is interconnected utilizing their respective first near-field magnetic induction communication units (not shown) and first magnetic field antennas 42 for digital exchange of data, such as audio signals, signal processing parameters, control data, such as identification of signal processing programs, etc., etc.

The first coils 42 are positioned in the first housings of the first and second monaural hearing aids, respectively, so that a centre axis of the first coil of the first monaural hearing aid (10) is parallel to, and preferably coincides with, a centre axis of the first coil of the second monaural hearing aid, when the first and second monaural hearing aids are worn in their intended operational positions at the ears of the user for normal use of the binaural hearing aid system. In this way, the first magnetic field antenna 10 of the second monaural hearing aid outputs a signal of maximum magnitude in response to a magnetic field generated by the first magnetic field antenna 42 of the first monaural hearing aid 10 as compared to a corresponding output signal of the first magnetic field antenna 42 of the second monaural hearing aid for any other orientation and position of the first magnetic field antennas 42 in the first housings 60 of the respective first and second monaural hearing aids, when the first and second hearing aids are worn in their intended operational positions at the ears of the user for normal use of the binaural hearing aid system.

Thus, in the monaural hearing aid 10 shown in FIG. 2, the first magnetic field antenna 42 has been positioned in the BTE housing 60 for optimum transmission of a local, non-propagating magnetic field in the direction of the other similar monaural hearing aid (not shown) worn by the user at the opposite ear of the user, the two monaural hearing aids constituting a binaural hearing aid system (not shown).

In this way, digital audio of a stereo channel, or the same mono audio signal, for the other ear can be transmitted to the monaural hearing aid at the other ear with little attenuation.

The monaural hearing aid 10 shown in FIG. 2 has an ear hook 62 that is configured to be connected to a sound tube for transmission of the acoustic signal output by the receiver 40 into the ear canal of the user as is well-known in the art of monaural hearing aids.

Another monaural hearing aid (not shown) according to the appended claim 1 is also provided that is similar to the monaural hearing aid 10 shown in FIG. 2, except for the fact the other monaural hearing aid (not shown) is a RIE hearing aid (not shown), wherein the receiver 40 has been moved from the BTE housing 60 to an earpiece (not shown) that is configured for insertion and retention in the ear canal (not shown) of the user and that is connected to the BTE housing with an electrical cable with conductors for connection of the receiver in the earpiece (not shown) with the electronic circuitry accommodated by the BTE housing 60.

Provision of near-field wireless data communication between components and electronic circuitry accommodated by the first and second housings 60, 110, respectively, eliminates the need for connectors for interfacing components and electronic circuitry of the first and second housings 60, 110 of the monaural hearing aid 10 so that size and cost of the housings 60, 110 of the monaural hearing aid 10 can be minimized. Further, monaural hearing aids with housings too small to accommodate a connector may now be equipped with the near-field wireless data communication so that the monaural hearing aid can perform data communication with an auxiliary device, e.g., an audio shoe that accommodates circuitry with various additional functionality, in the same way as monaural hearing aids with housings large enough to accommodate a connector.

The second housing 110 accommodates an energy storage device (not shown) in the form of a capacitor (not shown), for supplying power to the electronic circuitry (not shown in FIG. 2) accommodated by the second housing 110. The capacitor (not shown) is supplied with energy received by the second magnetic field antenna 118 through a diode (not shown).

Alternatively, or additionally, the second housing 110 may accommodate a battery for supplying power to the electronic circuitry (not shown) accommodated by the second housing 110.

Figure 3:
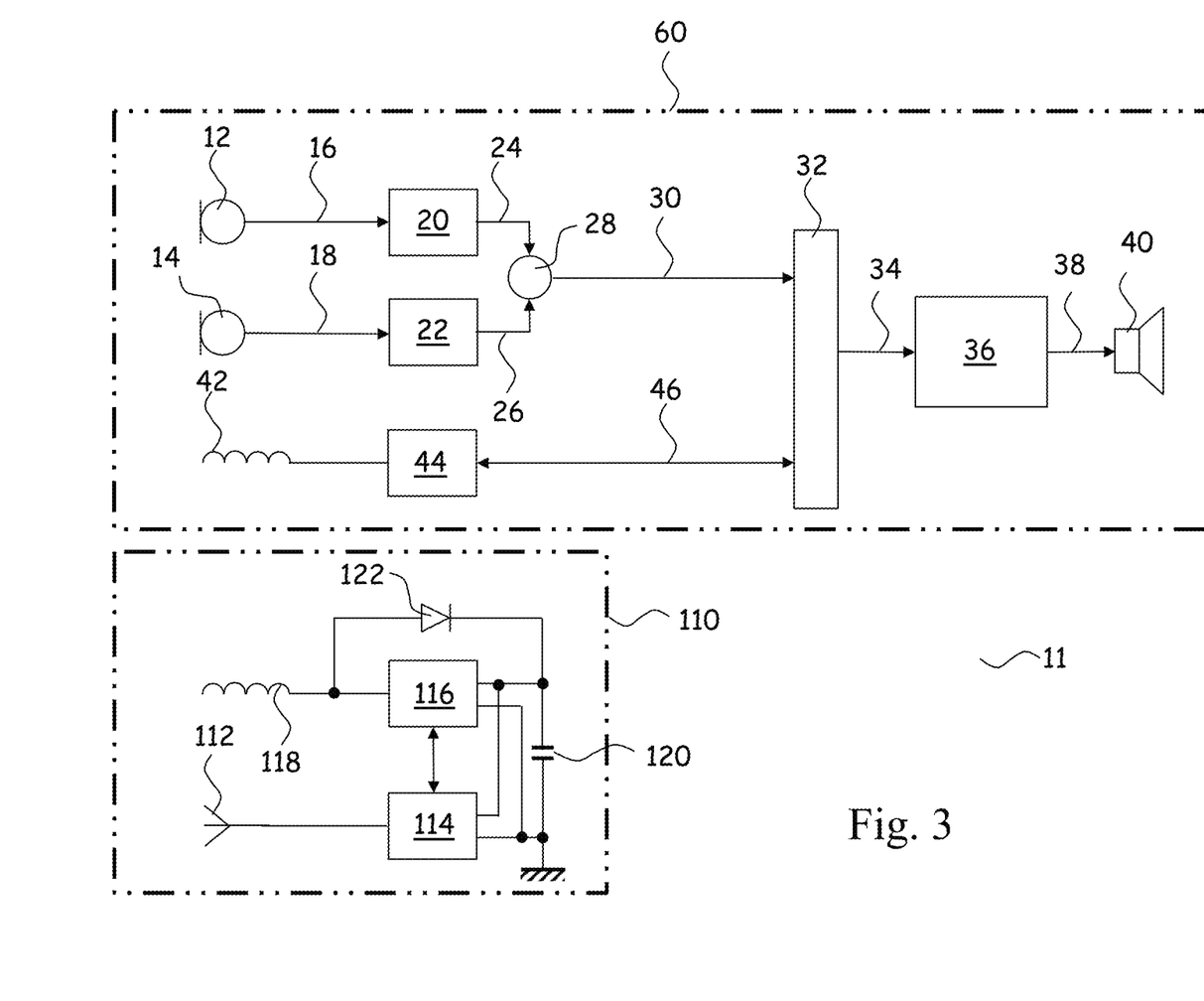
FIG. 3 is a block diagram of the electronic circuitry of the monaural hearing device shown in FIG. 2.

FIG. 3 shows a block diagram of the electronic circuitry 11 of the new monaural hearing aid shown in FIG. 2.

The illustrated monaural hearing aid circuitry 11 comprises a front microphone 12 and a rear microphone 14 for conversion of an acoustic sound signal from the surroundings into corresponding microphone audio signals 16, 18 output by the microphones 12, 14. The microphone audio signals 16, 18 are digitized in respective A/D converters 20, 22 for conversion of the respective microphone audio signals 16, 18 into respective digital microphone audio signals 24, 26 that are optionally pre-filtered (pre-filters not shown) and combined in signal combiner 28, for example for formation of a digital microphone audio signal 30 with directionality as is well-known in the art of hearing aids. The digital microphone audio signal 30 is input to the signal router 32 configured to output a weighted sum 34 of signals input to the signal router 32. The signal router output 34 is input to a hearing loss processor 36 configured to generate a hearing loss compensated output signal 38 based on the signal router output 34. The hearing loss compensated output signal 38 is input to a receiver 40 for conversion into acoustic sound for transmission towards an eardrum (not shown) of a user of the monaural hearing aid.

The illustrated monaural hearing aid circuitry 11 is further configured to receive data, including control signals and digital audio from various transmitters, such as mobile phones, smartphones, desktop computers, tablets, laptops, radios, media players, companion microphones, broadcasting systems, such as in a public place, e.g. in a church, an auditorium, a theatre, a cinema, etc., public address systems, such as in a railway station, an airport, a shopping mall, etc., etc.

In the illustrated example, it is possible for another device to transmit data including digital audio wirelessly to the monaural hearing aid via an audio shoe with a second housing 110 that is removably attached to the BTE housing 60 as illustrated in FIG. 1. The second housing 110 accommodates an RF-antenna 112 and an RF-transceiver 114 that is connected to the RF-antenna 112. The RF-transceiver 114 retrieves the digital data 46 from the signal received from the RF-antenna 112, e.g. including digital audio representing a stereo audio signal or a mono audio signal. The second housing 110 also accommodates a second near-field magnetic induction communication unit 116 and a second magnetic field antenna 118 comprising a coil wound around a ferrite core (not shown), and that is connected to the second near-field magnetic induction communication unit 116 that is configured to modulate the signal received from the RF-antenna 112 into a modulated signal suitable for transmission via the second magnetic field antenna 118 in such a way that that the second magnetic field antenna 118 emits a local, non-propagating magnetic field for reception by the corresponding first magnetic field antenna 42 accommodated by the BTE housing 60 and also comprising a coil wound around a ferrite core. Centre axes of the transmitting and receiving magnetic field antennas 118, 42 are aligned in parallel for optimum, or substantially optimum, reception when the audio shoe housing 110 is attached to the BTE housing 60 in its intended operational position. The BTE housing 60 also accommodates a first near-field magnetic induction communication unit 44 that is connected to the first magnetic field antenna 42 and retrieves the digital data from the signal received from the first magnetic field antenna 42, including the digital audio 46 representing a stereo audio signal or a mono audio signal and forward it to the signal router 32 to include the digital audio 46 of the stereo channel (or the mono audio signal) in the audio signal 34 that is input to the hearing loss processor 36 for hearing loss compensation.

The signal router 32 is also configured to route the stereo channel (or the mono audio signal) intended for a monaural hearing aid (not shown) worn at the other ear of the user to the first near-field magnetic induction communication unit 44 that modulates the digital audio 46 of the stereo channel in question (or the mono audio signal) into a modulated signal suitable for transmission via the first magnetic field antenna 42 that emits a local, non-propagating magnetic field in the direction of the other monaural hearing aid (not shown), i.e. with field lines aligned with a ferrite core of the second magnetic field antenna in the first housing of the other monaural hearing aid for optimum, or substantially optimum, reception when both monaural hearing aids are worn in their intended operational positions at the respective ears of the user during normal use. This is obtained by positioning the ferrite cores of the magnetic field antennas with longitudinal axes aligned in parallel, and preferably coinciding, when both monaural hearing aids are worn in their intended operational positions at the respective ears of the user during normal operation.

The other monaural hearing aid may have the same circuitry accommodated in the first housing 60 as shown in FIG. 3, wherein the first magnetic field antenna 42 receives the modulated magnetic field and converts it into a voltage that is output to the first near-field magnetic induction communication unit 44 that is configured to demodulate the digital audio 46 of the stereo channel (or the mono audio signal) and forward it to the signal router 32 to include the digital audio 46 of the stereo channel (or the mono audio signal) in the audio signal 34 that is input to the hearing loss processor 36 for hearing loss compensation.

In this way, the digital audio 46 of the stereo channel (or the mono audio signal) for the other ear is transmitted to the monaural hearing aid at the other ear with little attenuation.

The digital audio 46 may include audio from a plurality of sources and thus, the digital audio 46 may form a plurality of input signals for the signal router 32, one input signal for each source of audio.

In the event of receipt of digital audio by the RF-antenna 112, the digital audio 46 may be transmitted to the user while the other signal 30 is attenuated during transmission of the digital audio. The other signal 30 may also be muted. The user may enter a command through a user interface of the monaural hearing aid of a type well-known in the art, controlling whether the other signal 30 is muted, attenuated, or remains unchanged.

The second housing 110 of the illustrated audio shoe also accommodates a rechargeable energy storage device 120 in the form of a capacitor 120 for supplying power to electronic components 114, 116 of the electronic circuit accommodated by the second housing 110. The capacitor 120 is recharged by energy received by the second magnetic field antenna 118 and supplied to the capacitor 120 through diode 122.

The first near-field magnetic induction communication unit 44 forwards a high frequency signal, preferably the carrier signal, e.g. with a frequency of 10.66 MHz or 22.66 MHz, to the first magnetic field antenna 42 for transmission to the second magnetic field antenna 118 for recharging the capacitor 120.

Alternatively, or additionally, the circuitry accommodated by the second housing 110 is powered by a battery (not shown).

The circuitry accommodated by the first housing 60, i.e. the BTE housing 60, is powered by the battery 80 shown in FIG. 2.

Figure 4:
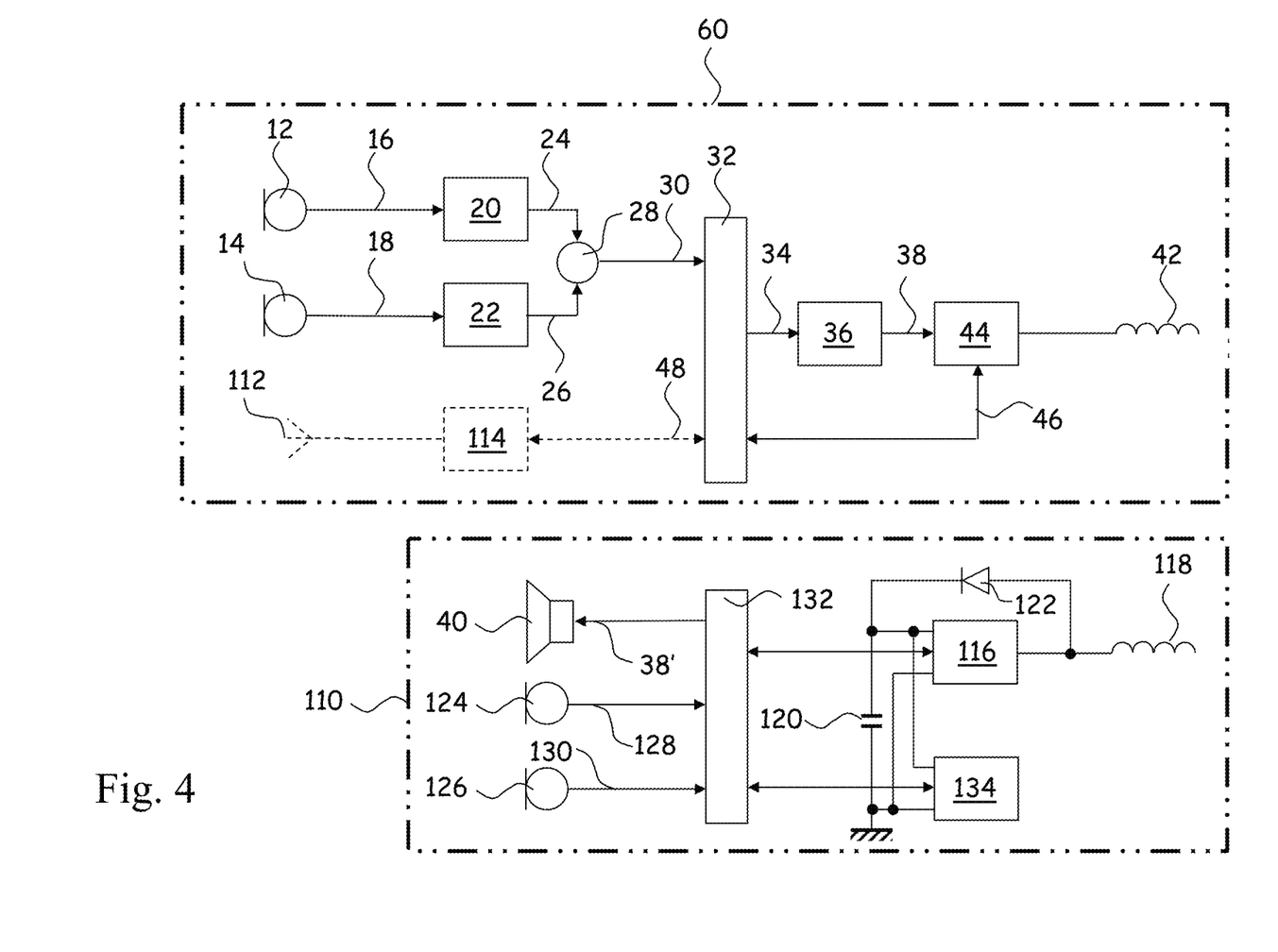
FIG. 4 is a block diagram of the electronic circuitry of another monaural hearing device according to appended claim 1.

FIG. 4 is a block diagram of the electronic circuitry of another monaural hearing aid in the form of a RIE hearing aid according to appended claim 1, and wherein the second housing 110 is the housing of an ear piece. The ear piece of the illustrated monaural hearing aid is similar to the ear piece of the RIE hearing aid disclosed in EP 3 101 917 A1 except for the fact that in the new monaural hearing aid, the connectors, conductors and cable of the wired interface disclosed in EP 3 101 917 A1 for interconnecting the earpiece with the electronic circuitry of the BTE housing, have been substituted by a near-field wireless interface comprising a first near-field magnetic induction communication unit 44 and a first magnetic field antenna 42 accommodated by the BTE housing 60 and a second near-field magnetic induction communication unit 116 and a second magnetic field antenna 118 accommodated by the ear piece housing 110 for performing near-field wireless data communication with the first magnetic field antenna 42 and the first near-field magnetic induction communication unit 44 in a way similar to the wireless interface of the electronic circuitry of FIG. 3.

The new monaural hearing aid 10 of FIG. 4 comprises a first housing 60 in the form of a BTE housing 60 adapted to be worn behind a pinna (not shown) of a user (not shown) of the monaural hearing aid 10. The BTE housing 60 accommodates electronic circuitry similar to the electronic circuitry of the BTE housing 60 shown in FIG. 3 apart from the fact that the receiver 40 has been moved from the BTE housing to the housing 110 of the ear piece.

As in the electronic circuitry shown in FIG. 3 of the BTE housing 60, the BTE housing 60 accommodates a first near-field magnetic induction communication unit 44 and a first magnetic field antenna 42 that is connected to the first near-field magnetic induction communication unit 44 for performing near-field wireless data communication; however in the electronic circuitry of FIG. 4 the hearing loss compensated output signal 38 is input to the first near-field magnetic induction communication unit 44 and transmitted wirelessly to the earpiece for transmission to the receiver 40 accommodated in the ear piece.

In the same way as shown in FIGS. 2 and 3, an audio shoe 100 may also form part of the monaural hearing aid 10 of FIG. 4 so that the first near-field magnetic induction communication unit 44 and the first magnetic field antenna 42 accommodated by the BTE housing 60 of FIG. 4 is also used for data communication with the audio shoe 100 in the same was as explained above in connection with FIGS. 2 and 3.

Alternatively, or additionally, parts of the electronic circuitry of the audio shoe 100 may be included in the electronic circuitry of the BTE housing 60 of FIG. 4 as illustrated by optional components, e.g. RF-antenna 112 and RF-transceiver 114 and line 48, drawn with dashed lines in FIG. 4.

Thus, the monaural hearing aid 10 further comprises a second housing 110 in the form of the housing 110 of an ear piece. The housing 110 of the ear piece accommodates the second near-field magnetic induction communication unit 116 and the second magnetic field antenna 118 that is connected to the second near-field magnetic induction communication unit 116 for performing near-field wireless data communication with the first magnetic field antenna 42 and the first near-field magnetic induction communication unit 44.

The housing 110 of the ear piece also accommodates microphones 124, 126 and microcontroller 134 with a non-volatile memory for storing data relating to a configuration of the ear piece as disclosed in EP 3 101 917 A1.

The receiver 40, the microphones 124, 126, and the microcontroller 134 shown in FIG. 4 correspond to the receiver 22, microphones 26, 66, and microcontroller 40, respectively, shown in FIG. 4 of EP 3 101 917 A1 and the receiver 40, the microphones 124, 126, and the microcontroller 134 shown in FIG. 4 operate in the same way as disclosed in EP 3 101 917 A1.

Signal router 132 routes signals from the second near-field magnetic induction communication unit 116 to the receiver 40, and from the microphones 124, 126 to the second near-field magnetic induction communication unit 116, and between the microcontroller 134 and the second near-field magnetic induction communication unit 116 as required.

The second housing 110 also accommodates a rechargeable energy storage device 120 in the form of a capacitor 120 for supplying power to electronic components 114, 116 of the electronic circuit accommodated by the second housing 110. The capacitor 120 is recharged by energy received by the second magnetic field antenna 118 and supplied to the capacitor 120 through diode 122.

The first near-field magnetic induction communication unit 44 forwards a high frequency signal, preferably the carrier signal, e.g. with a frequency of 10.66 MHz or 22.66 MHz, to the first magnetic field antenna 42 for transmission to the second magnetic field antenna 118 for recharging the capacitor 120.

Alternatively, or additionally, the circuitry accommodated by the second housing 110 is powered by a battery (not shown).

The circuitry accommodated by the first housing 60, i.e. the BTE housing 60, is powered by a battery (not shown) similar to the battery 80 shown in FIG. 2.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

The invention claimed is:

1. A monaural hearing device comprising:
a first housing accommodating a first near-field magnetic induction communication unit and a first magnetic field antenna connected to the first near-field magnetic induction communication unit, wherein the first housing is configured for placement behind an ear of a user of the monaural hearing device; and
a second housing accommodating a second near-field magnetic induction communication unit and a second magnetic field antenna connected to the second near-field magnetic induction communication unit;
wherein the first and second near-field magnetic induction communication units connected to the first and second magnetic field antennas, respectively, are configured to perform near-field wireless data communication with each other via the first magnetic field antenna and the second magnetic field antenna of the monaural hearing device.

2. The monaural hearing device according to claim 1, wherein the second housing accommodates an energy storage device for supplying power to an electronic circuit accommodated by the second housing; and
wherein the energy storage device is connected to the second magnetic field antenna for wireless reception of energy, and is configured to store the energy.

3. The monaural hearing device according to claim 1, wherein the second housing accommodates an output transducer configured to convert an audio signal into an auditory output signal that can be received by an auditory system of the user.

4. The monaural hearing device according to claim 1, wherein the second housing is configured for placement at an ear of the user.

5. The monaural hearing device according to claim 1, wherein the second housing is configured for being mounted to the first housing.

6. The monaural hearing device according to claim 5, wherein the second housing accommodates an RF-transceiver and an RF-antenna connected to the RF-transceiver for performing far-field wireless data communication with another device.

7. The monaural hearing device according to claim 1, wherein the monaural hearing device is a monaural hearing aid.

8. The monaural hearing device according to claim 7, wherein the monaural hearing aid comprises a processing unit configured to process an audio signal, and to provide a hearing loss compensated audio signal based on the audio signal to an output transducer.

9. The monaural hearing device according to claim 1, wherein the first and second magnetic field antennas in the first and second housings, respectively, are aligned, when the first and second housings are worn by the user.

10. The monaural hearing device according to claim 1, wherein one of the first and second magnetic field antennas is a transmitting magnetic field antenna, and the other one of the first and second magnetic field antennas is a receiving magnetic field antenna, and wherein the receiving magnetic field antenna is configured to output an output signal in response to a magnetic field modulated by the transmitting magnetic field antenna.

11. The monaural hearing device according to claim 10, wherein the output signal has a magnitude that is higher compared to other corresponding output signals for other theoretical orientations and positions of the first and second magnetic field antennas in the respective first and second housings, when the first and second housings are in their intended operational positions with respect to the user when the monaural hearing device is worn by the user.

12. The monaural hearing device according to claim 1, wherein one of the first and second near-field magnetic induction communication units is configured to provide audio data for reception by the other one of the first and second near-field magnetic induction communication units.

13. A binaural hearing system comprising:
the monaural hearing device according to claim 1; and
an additional monaural hearing device;
wherein the monaural hearing device is a first hearing device, and the additional monaural hearing device is a second hearing device.

14. The binaural hearing system according to claim 13, wherein the second monaural hearing device comprises another first housing accommodating another first near-field magnetic induction communication unit and another first magnetic field antenna connected to the other first near-field magnetic induction communication unit;
wherein the first near-field magnetic induction communication units and the first magnetic field antennas of the first and second monaural hearing devices, respectively, are configured for performing near-field wireless data communication between the first and second monaural hearing devices.

15. The binaural hearing system according to claim 14, wherein the first magnetic field antenna of the first monaural hearing device is positioned in the first housing of the first monaural hearing device, and the other first magnetic field antenna of the second monaural hearing device is positioned in the other first housing of the second monaural hearing device so that, when the first and second monaural hearing devices are worn by the user, a magnetic field generated by the first magnetic field antenna of the first monaural hearing device is aligned with the other first magnetic field antenna of the second monaural hearing device.

16. A monaural hearing device comprising:
a first housing accommodating a first near-field magnetic induction communication unit and a first magnetic field antenna connected to the first near-field magnetic induction communication unit, wherein the first housing is configured for placement behind an ear of a user of the monaural hearing device; and
a second housing accommodating a second near-field magnetic induction communication unit and a second magnetic field antenna connected to the second near-field magnetic induction communication unit;
wherein the first and second near-field magnetic induction communication units connected to the first and second magnetic field antennas, respectively, are configured to perform near-field wireless data communication with each other;
wherein the first magnetic field antenna comprises a first coil, and the second magnetic field antenna comprises a second coil, and wherein the first and second coils are positioned in the first and second housings, respectively, so that an axis of the first coil is parallel to an axis of the second coil, when the first and second housings are in their respective intended operational positions with respect to the user when the monaural hearing device is worn by the user.

17. The monaural hearing device according to claim 16, wherein the axis of the first coil coincides with the axis of the second coil, when the first and second housings are in their intended operational positions with respect to the user when the monaural hearing device is worn by the user.

18. The monaural hearing device according to claim 16, wherein the first and second coils are wound around first and second magnetic cores, respectively.

19. A binaural hearing system comprising:
a monaural hearing device comprising:
a first housing accommodating a first near-field magnetic induction communication unit and a first magnetic field antenna connected to the first near-field magnetic induction communication unit, wherein the first housing is configured for placement behind an ear of a user of the monaural hearing device; and
a second housing accommodating a second near-field magnetic induction communication unit and a second magnetic field antenna connected to the second near-field magnetic induction communication unit;
wherein the first and second near-field magnetic induction communication units connected to the first and second magnetic field antennas, respectively, are configured to perform near-field wireless data communication with each other; and
an additional monaural hearing device;
wherein the monaural hearing device is a first hearing device, and the additional monaural hearing device is a second hearing device;
wherein the second monaural hearing device comprises another first housing accommodating another first near-field magnetic induction communication unit and another first magnetic field antenna connected to the other first near-field magnetic induction communication unit;
wherein the first near-field magnetic induction communication units and the first magnetic field antennas of the first and second monaural hearing devices, respectively, are configured for performing near-field wireless data communication between the first and second monaural hearing devices;

wherein the first magnetic field antenna of the first monaural hearing device comprises a first coil, and the other first magnetic field antenna of the second monaural hearing device comprises another first coil; and wherein the first coil is positioned in the first housing of the first monaural hearing device, and the other first coil is positioned in the other first housing of the second monaural hearing device, so that an axis of the first coil of the first monaural hearing device is parallel to an axis of the other first coil of the second monaural hearing device, when the first and second monaural hearing devices are worn by the user.

20. The binaural hearing system according to claim 19, wherein the axis of the first coil of the first monaural hearing device coincides with the axis of the other first coil of the second monaural hearing device, when the first and second monaural hearing devices are worn by the user.

* * * * *